Jan. 30, 1968  R. E. SMITH ET AL  3,366,344
CABLE REWIND ASSEMBLY
Filed June 4, 1965  3 Sheets-Sheet 1

INVENTORS.
Reynold E. Smith
Cecil Ware
Robert A. Crowley
Mildred K. Flowers
AGENT Jan. 30, 1968    R. E. SMITH ET AL    3,366,344
CABLE REWIND ASSEMBLY
Filed June 4, 1965    3 Sheets-Sheet 3

INVENTORS.
Reynold E. Smith
Cecil Ware
Robert A. Crowley
Mildred K. Flowers
AGENT

United States Patent Office 3,366,344
Patented Jan. 30, 1968

3,366,344
CABLE REWIND ASSEMBLY
Reynold E. Smith, Cecil Ware, and Robert A. Crowley, Longview, Tex., assignors to Lebus Royalty Company, Longview, Tex., a partnership
Filed June 4, 1965, Ser. No. 461,302
4 Claims. (Cl. 242—86.5)

This invention relates to improvements in cable spooling apparatus and more particularly, but not by way of limitation, to a self-contained mobile cable transfer or re-wind unit.

Wire line, or cable, utilized in a great variety of cable spooling operations, such as hoisting operations, mining operations, and the like, or normally stored in great lengths on large storage drums. These storage drums usually contain as much as 35,000 feet of cable, and in some instances may contain even greater lengths. Obviously, many winches, hoisting drums, or the like, do not require cables of these great lengths, and in addition, are usually located at remote positions with regard to the storage drums. As a result problems are encountered in transferring cable from the storage drum to the winch, or cable reel, wherein the cable is to be utilized. Furthermore, it is frequently difficult to unwind or remove worn cable from a cable or hoisting drum and replace the worn cable with new cable. For example, in the transfer of cable from one reel or drum to another, the cable is usually pulled onto the drum being filled by rotation thereof. If the speed of rotation of the drum varies, or the rotation thereof is stopped, it is difficult to prevent slack in the line or cable. It will be readily apparent that this is of great disadvantage in a cable spooling operation.

The present invention contemplates a novel self-contained mobile unit particularly designed for transferring cable from a storage drum to a remotely located spooling drum or winch, and also for facilitating removal of any old or worn cable from a spooling drum and replacing the worn cable with new cable. The novel re-wind assembly is mounted on a wheeled vehicle structure of the trailer type which may be readily moved from the location of the storage roll to the site of the winch or drum to be supplied with the new cable. The unit is normally provided with two removable spooling drums whereby one of the drums may be mounted on the unit for utilization in the winding of cable thereon from the storage drum. The desired length of cable may be efficiently wound on the removable drum of the re-wind unit, and the entire unit may then be pulled or moved in the usual manner of a trailer to position the removable drum in the proximity of the winch or spooling drum which is to receive the new cable. In the event the drum is to be wound is empty, of course the cable may be spooled from the re-wind unit drum directly onto the empty drum. The re-wind unit is particularly provided with means for maintaining tension in the cable during the spooling operation for filling of the empty drum. Thus, if the drum being filled with the cable stops rotating for any reason, or if the speed of rotation fluctuates, the line or cable will remain in tension and will not become slack.

If the drum to be provided with the new cable is filled with a cable to be removed prior to the spooling operation, the re-wind unit drum having the new cable thereon may be removed from the trailer unit and replaced with the second re-wind unit drum which is empty. The re-wind unit may be operated for pulling the worn cable from the drum which is to be rewound for winding the worn cable onto the empty drum of the re-wable unit. When the worn cable has thus been completely removed from the drum to be rewound, the re-wind unit drum containing the worn cable may then be removed from the re-wind unit and replaced with the drum containing the new cable. The new cable may then be wound onto the drum from which the worn cable was removed. The entire operation may be accomplished efficiently and speedily since there is no need to move the re-wind unit during the entire cable transfer operation or spooling and unspooling procedure.

It is an important object of this invention to provide a novel self-contained mobile unit for transferring cable from one spooling drum or winch to a second spooling drum.

Another object of this invention is to provide a novel mobile cable re-wind unit which may be utilized for removing worn cable from a spooling drum and replacing the worn cable with new cable with great efficiency and speed.

Still another object of this invention is to provide a novel mobile cable re-wind unit particularly designed and constructed for holding tension in the cable while the cable is being spooled from the re-wind unit onto a spooling drum or winch for substantially precluding any slack in the cable during a cable transfer operation.

It is a further object of this invention to provide a novel mobile cable re-wind unit which is simple and efficient in operation and economical and durable in construction.

Other and further objects and advantageous features of the present invention will hereinafter more fully appear in connection with a detailed description of the drawings in which.

Figure 2:
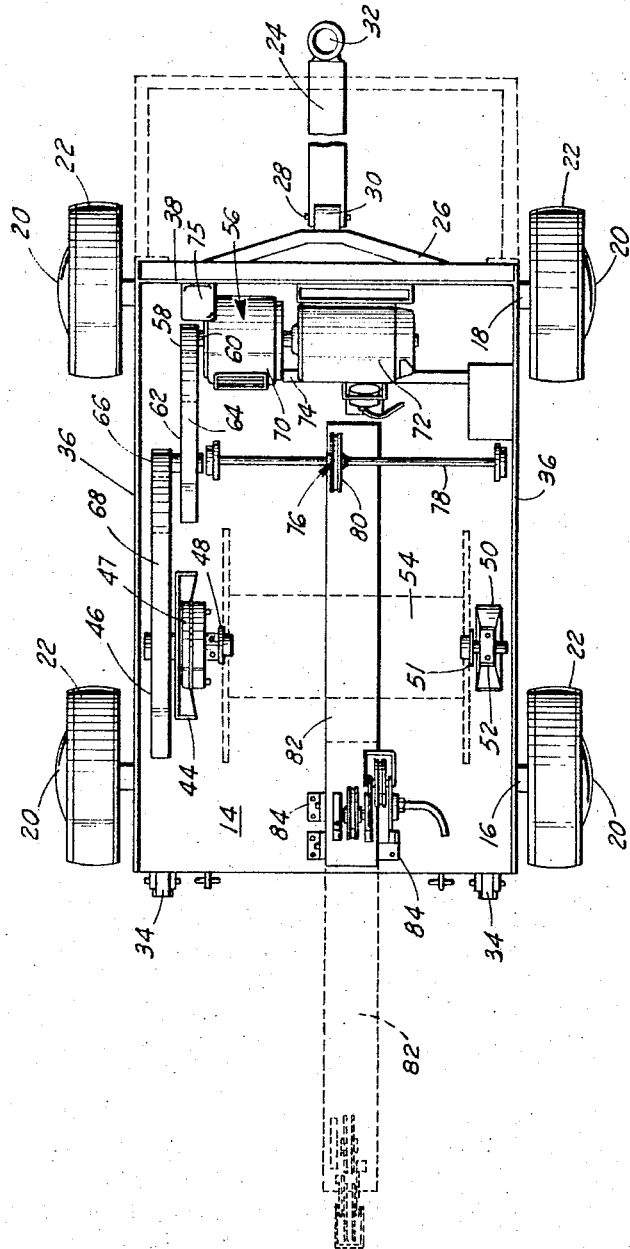
FIGURE 2 is a plan view of a cable re-wind unit embodying the invention, with portions thereof shown in dotted lines for purposes of illustration.

Referring to the drawings in detail, reference character 10 generally indicates a cable re-wind assembly or unit comprising a suitable structural frame 12 having a floor plate 14 (FIGURE 2) supported thereby. The frame 12 is suitably mounted on a pair of spaced tandem axles 16 and 18 having the usual wheels 20 rotatably secured at the outer extremities thereof in any well known manner. The wheels 20 are preferably provided with pneumatic type tires 22 for facilitating transporting of the unit 10, as is well known. In addition, a tow bar 24 of any suitable type may be secured to one end of the frame 12 by means of a substantially centrally disposed yoke member 26.

Figure 1:
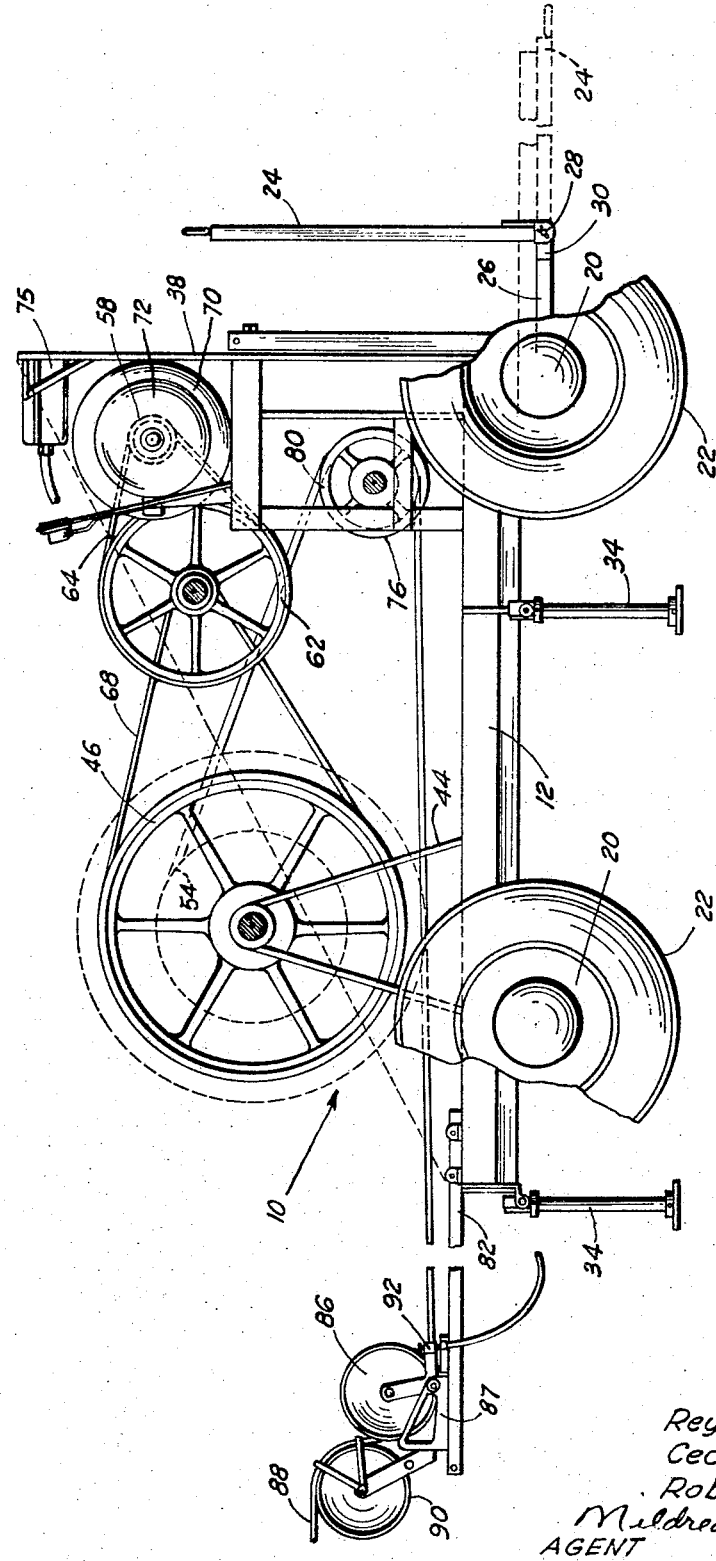
FIGURE 1 is a side elevational view of a cable re-wind unit embodying the invention, with certain portions eliminated and other portions depicted in dotted lines for purposes of illustration.

One end of the bar 24 is pivotally secured at 28 to an outwardly extending boss member 30 carried by the yoke 26 whereby the tow bar 24 may be pivoted into a substantially vertical position, as shown in solid lines in FIGURE 1, when the unit 10 is stationary. The bar 24 may be pivoted to a substantially horizontal position as shown in dotted lines in FIGURE 1 when the unit 10 is to be transported. The opposite end of the bar 24 is preferably provided with an aperture or eye 32 for facilitating engagement thereof with a towing vehicle (not shown) as is well known. A plurality of suitable support jack members 34 are pivotally secured to the frame 12 in such a manner that the jacks 34 may be disposed in engagement with the surface of the ground for supporting the unit 10 in a stationary position, and may be moved into an "out-of-the-way" position adjacent the under side of the frame 12 when the unit 10 is being transported.

Figure 3:
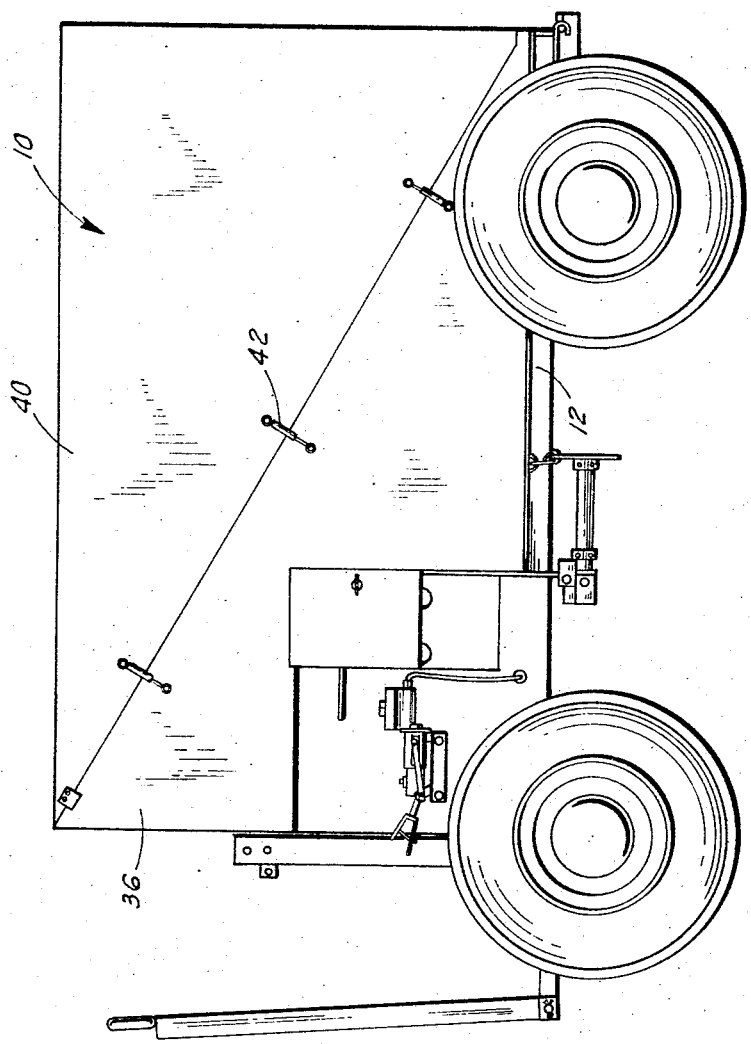
FIGURE 3 is a side elevational view of a cable re-wind unit embodying the invention and depicted in a storage or "in-transit" position.

A pair of oppositely disposed substantially triangular shaped side walls 36 extend upwardly from the floor plate 14 and a vertically disposed plate member 38 extends transversely therebetween at one end thereof. A cover box 40 (FIGURE 3) is provided for cooperating with the side walls 36 and plate 38 to substantially encase the unit 10 during transporting or storage thereof, if desired. The cover box 40 may be removably secured to the side walls 36 and plate 38 in any suitable manner, such as by the clip members 42.

A first A-frame or support member 44 is mounted on the floor plate 14 and extends upwardly therefrom for supporting a drive wheel 46. A suitable housing 47 carrying a flange member 48 may be secured to the wheel 46. A second A-frame or support member 50 is secured to the floor plate 14 and extends upwardly therefrom for receiving a pillow block bearing 52 thereon. A suitable flange member 51 may be secured to the pillow block 52 and the second support 50 is spaced from the first support 44 and is in substantial alignment therewith whereby a spooling drum 54 may be removably supported between the flange members 48 and 51 as will be hereinafter set forth in detail.

The drive wheel 46 is rotated or driven by a suitable power supply generally indicated at 56 through a drive mechanism which may comprise a first pulley or sheave 58 connected directly to a drive shaft 60 of the power supply 56 for rotation thereby. The sheave 58 is in turn connected with a second pulley or idler sheave 62 by means of an endless belt 64 whereby rotation is transmitted therebetween. A third wheel or sheave 66 is suitably connected with or coupled to the sheave 62 for rotation simultaneously therewith. The drive wheel 46 is connected with the sheave or wheel 66 by a suitable endless belt 68 for rotation thereby. The drive mechanism for transmitting rotation from the power source 56 to the drive wheel 46 may be of any suitable type and is not limited to the pulley and belt arrangement depicted herein. Of course, the wheels or sheaves 62 and 66 may be journalled to or supported by any suitable framework or support structure (not shown) or may be carried directly by one of the side walls 36, as desired. In addition, it will be apparent that the drive ratio between the power source 56 and drive wheel 46 may be regulated or determined by the relative size of the pulleys or sheaves interposed therebetween.

Whereas the power source 56 may be of any desired type, such as a hydraulic system utilizing suitable pressure control valves and multiple position fluid control valves in combination with a pump and hydraulic piston type motor, the power source 56 as depicted herein comprises an eddy current type clutch mechanism 70 actuated or driven by a suitable motor 72. The clutch 70 and motor 72 may be mounted on or carried by a suitable support bracket or frame 74 which, in turn, may be secured to the wall 38. The eddy current clutch 70 is of a slip clutch type which actuates the drive mechanism through a magnetic field, as is well known in this type of equipment. In operation, the clutch 70 constantly urges the drum 54 in a rotational direction opposite to the direction of pull of the cable being removed therefrom for maintaining a constant tension in the line during a cable transfer operation. Of course, the motor 72 may be of any suitable type, such as electrical, and the source of power therefor may be either from the towing vehicle (not shown), as is well known, or a power plant (not shown) may be installed on the unit 10, or any other source of electrical energy or current. Whereas the clutch 70, operating in a reverse direction with respect to the direction of pull of the cable from the drum 54, functions to maintain a constant braking action for the rotation of the drum 54, it is desirable to provide a suitable master cylinder brake indicated at 75, or other additional braking mechanism for stopping the rotation of the drum 54. The braking mechanism 75 may be connected with the power source 56, or drive wheel 46, as desired, in any well known manner whereby the rotation of the drum 54 will be immediately interrupted or stopped in the event of a power failure. Thus, the drum 54 will never accidentally become a "free wheeling" drum.

A fleet angle compensator apparatus, generally indicated at 76, is mounted on the floor plate 14 in juxtaposition with the drum 54. The fleet angle compensator apparatus 76 may be of any suitable type, and is preferably of the type disclosed in the F. L. LeBus, Sr. et al. Patent No. 3,122,341, issued Feb. 25, 1964, and entitled "Automatic Fleet Angle Compensation Apparatus." The fleet angle compensator 76 includes an eccentric oscillating shaft 78 having a movable sheave 80 journalled thereon. The sheave 80 moves longitudinally along the shaft 78, and the shaft 78 oscillates in an eccentric manner during a cable spooling operation, as is well known for maintaining the cable in a substantially perpendicular path with respect to the drum axis.

An extension bar 82 is slidably disposed on the floor plate 14 and extends between spaced complementary pairs of guide brackets 84 which are bolted or otherwise secured to the plate 14. A suitable sheave 86 is journalled on a bracket support 87 which is carried in the proximity of the outer end of the bar 82. The sheave 86 may be of a swivel type, if desired, but as depicted herein is a fixed sheave as is normally utilized in a cable spooling operation for receiving the cable 88 therearound, as will be hereinafter set forth. In the particular embodiment of the invention shown herein a double sheave arrangement is utilized wherein a second sheave 90 is also carried by the bar 82 for cooperation with the sheave 86 in the usual manner of such installations. In addition, a suitable load cell or tension indicator device 92 is utilized in conjunction with the sheaves 86 and 90 for providing an indication of the tension of the line or cable 88 during the cable spooling operation. The bar 82 may be extended to the position shown in solid lines in FIGURE 1 during the cable spooling operation, if desired, and may be moved to the contracted position as shown in solid lines in FIGURE 2 during transporting of the unit 10.

Of course, suitable weight indicator devices may be provided for the unit 10, as well as cable footage counting devices and cable speed indicators, if desired.

Operation

When it is desired to remove worn cable from a cable reel such as a cable reel mounted in an aircraft, or the like, and to replace the worn cable with new cable, or there is any other cable transfer operation required, the unit 10 may be utilized with speed and efficiency.

As hereinbefore set forth, the unit 10 is preferably provided with two drums 54 which may be independently and removably secured between the flanges 48 and 51. One of the drums 54 may be secured between the flanges 48 and 51 in the usual manner, such as bolts, or the like, and the unit 10 may be transported to the site or location of the cable storage drum (not shown). The unit 10 may be so positioned with respect to the storage drum that the cable 88 may be passed over and under the sheaves 90 and 86 and around the movable sheave 80 in the usual manner and connected with the drum 54 as is well known. The power source 56 is then actuated in the usual manner for rotation of the drum 54 in an appropriate direction whereby the cable 88 may be readily and efficiently wound on the drum 54. The fleet angle compensator apparatus 76 in combination with the sheaves 90 and 86 provide a control of the spooling operation and in addition, the drum 54 may be provided with suitable grooving on the outer periphery thereof as to permit a counterbalanced spooling commonly known as the LeBus Spooling method thereon. When the desired length of new cable has been wound on the drum 54, the unit 10 may be moved to the site or location of the cable reel to receive the new cable.

At the site of the cable reel to be rewound, the filled drum 54 may be removed from the unit 10 and the empty drum 54 may be positioned between the flanges 48 and 51 in lieu thereof. The worn cable on the cable reel may then be removed therefrom by spooling thereof onto the empty drum 54 in the usual manner, as is well known. Subsequent to the removal of the worn cable, the drum 54 now containing the worn cable may be removed from the unit 10, and the drum 54 having the new cable thereon may be replaced in position between the flanges 48 and 51. Of course, it is normally necessary to use a fork-lift vehicle (not shown) for manipulation of the filled drums due to the weight thereof.

When the new cable is to be wound onto the cable reel, the new cable is connected with the cable reel in the usual manner. Normally, the cable reel is rotated for pulling the new cable from the drum 54. As hereinbefore set forth, the power source 56 is actuated for transmitting rotation to the drum in a direction reverse from the pulling direction of the cable, thus providing a constant tension in the cable being spooled onto the cable reel. If there is any fluctuation in the rotational speed of the cable reel, or if the reel being wound stops rotating for any reason, the tension is maintained in the cable, and in this manner, slack line or sagging of the cable is prevented.

In the event of a power failure wherein the power source 56 becomes inactive, the master cylinder braking device 75 may be manually actuated in the usual manner by the operator of the unit 10 for precluding a complete loss of control of the spooling operation. Of course, suitable controls, hand operating levers, and the like, are provided for the convenience of the operator of the equipment during cable winding or transfer operation.

From the foregoing it will be apparent that the present invention provides a novel self-contained mobile unit for efficiently and quickly effecting the transfer of cable from one cable spooling drum or reel to another. The novel re-wind unit is provided with power means for rotation of the drum constantly in a direction opposed to the direction of pull of the cable from the drum during a transfer operation to an empty spool or reel. Thus, tension is maintained in the line or cable at all times for precluding slack in the line. The mobile unit may be readily transported to the site of the spooling drum or winch to be wound, such as in the proximity of an aircraft having a reel thereof to be provided with new cable. Any old or worn cable may be removed from the reel to be rewound, and the new cable may be efficiently wound on the empty reel subsequent to removal of the worn cable therefrom. The novel rewind unit is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A mobile cable rewind unit comprising a wheel mounted frame portion, power means carried by the frame portion and operable independently of the wheels, and interchangeable spooling drum provided for the unit and adapted to be rotatably mounted thereon, drive means interposed between the power means and the drum mounted on the frame for transmitting rotation to the drum during a cable transfer operation, sheave means carried by the frame portion for receiving the cable therearound, fleet angle compensator means carried by the frame portion, said drum being disposed between the sheave means and fleet angle compensator means whereby the cable extends from the sheave means and below the drum to the fleet angle compensator means and thence to the drum, said fleet angle compensator means being disposed in juxtaposition with the drum for receiving the cable extending between the sheave means and drum means to maintain the cable portion between the fleet angle compensator and drum in a path substantially perpendicular to the longitudinal axis of the drum, said power means being operable for rotating the drum in a direction opposite to the pull of the cable in a cable transfer operation for maintaining tension on the cable during the operation.

2. A mobile cable rewind unit comprising a wheel mounted frame portion, power means carried by the frame portion independent of the wheels, rotatable drum means carried by the frame portion and removably secured thereon, drive means interposed between the drum means and power means for transmitting rotation to the drum means, slidable means secured to the frame portion and alternately extensible and contractible with respect thereto, sheave means carried by the slidable means for receiving a cable therearound, fleet angle compensator means carried by the frame portion and secured in juxtaposition to the drum whereby the drum is disposed between the sheave means and the fleet angle compensator means, said cable extending from the sheave means through a path below the drum and around the fleet angle compensator means to the drum, said fleet angle compensator means including a movable sheave adapted for receiving the cable between the first sheave means and the drum whereby the cable portion extending between the movable sheave and the drum is maintained substantially perpendicular with respect to the longitudinal axis of the drum during a cable transfer operation, said power means being operable for rotation of the drum in a direction opposite with respect to the pull of the cable therefrom during the cable transfer operation for maintaining tension in the cable.

3. A mobile cable rewind unit comprising a movable frame portion, power means carried by the frame portion, rotatable drum means removably mounted on the frame portion, drive means interposed between the drum means and power means for transmitting rotation to the drum during a cable transfer operation, fleet angle compensator means carried by the frame portion, sheave means carried by the frame portion for receiving the cable thereover, said cable extending between the sheave means and the drum through a path of travel below the drum and around the fleet angle compensator means, said fleet angle compensator means being disposed in juxtaposition with respect to the drum means for maintaining the cable portion extending between the fleet angle compensator and the drum in a path substantially perpendicular to the longitudinal axis of the drum during the cable transfer operation, said power means being operable for rotating the drum in a reverse direction with respect to the pull of the cable for maintaining tension on the cable during the transfer operation, pivotal jack means carried by the frame portion and movable into a support position therefore during a cable transfer operation and movable into a stowage position during transporting of the unit, and tow bar means carried by the frame portion for facilitating transporting of the unit.

4. A mobile cable rewind unit comprising a wheel mounted frame portion, power means carried by the frame portion, rotatable drum means carried by the frame portion and removably secured thereon, drive means interposed between the drum means and power means for transmitting rotation to the drum means during a cable transfer operation, slidable means secured to the frame portion and alternately extensible and contractible with respect thereto, sheave means carried by the slidable means for receiving a cable therearound, fleet angle compensator means carried by the frame portion and secured in juxtaposition with the drum, said cable extending from the sheave means through a path below the drum and around the fleet angle compensator means and thence to the drum, said fleet angle compensator means including a movable sheave adapted for receiving the cable therearound between the first sheave means and the drum means whereby the cable portion extending between the movable sheave and the drum is maintained substantially perpendicular with respect to the longitudinal axis of the drum during the cable transfer operation, said power means being operable for rotation of the drum in a reversed direction with respect to the pull of the cable for maintaining tension in the cable during the cable transfer operation, jack means carried by the frame portion for support of the unit during the cable transfer operation, and tow bar means carried by the frame portion for facilitating transporting of the unit.

References Cited

UNITED STATES PATENTS

| | | | |
|---|---|---|---|
| 853,522 | 5/1907 | Shaver | 242—86.51 X |
| 2,055,681 | 9/1936 | Cartlidge | 242—86.51 |
| 1,813,831 | 7/1931 | Wessler | 242—86.51 |
| 2,365,691 | 12/1944 | Fodor | 242—75.51 |
| 2,501,390 | 3/1950 | Jeffreys | 242—86.5 |
| 2,913,194 | 11/1959 | Garnett | 242—86.5 |
| 3,122,341 | 2/1964 | LeBus et al. | 242—157.1 |

STANLEY N. GILREATH, *Primary Examiner.*

N. L. MINTZ, *Assistant Examiner.*